US008497636B2

(12) United States Patent
Nerone

(10) Patent No.: US 8,497,636 B2
(45) Date of Patent: Jul. 30, 2013

(54) AUTO-SWITCHING TRIAC COMPATIBILITY CIRCUIT WITH AUTO-LEVELING AND OVERVOLTAGE PROTECTION

(75) Inventor: Louis Robert Nerone, Breckville, OH (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 13/045,921

(22) Filed: Mar. 11, 2011

(65) Prior Publication Data

US 2012/0229044 A1   Sep. 13, 2012

(51) Int. Cl.
*H05B 37/02* (2006.01)

(52) U.S. Cl.
USPC ............................ 315/210; 315/226; 315/291

(58) Field of Classification Search
USPC ............ 315/210, 209 R, 219, 223–226, 244, 315/246, 283, 287, 291, 307, 308, 360
See application file for complete search history.

(56) References Cited

U.S. PATENT DOCUMENTS

| 5,430,356 | A | * | 7/1995 | Ference et al. ................. 315/291 |
| 6,150,771 | A |   | 11/2000 | Perry |
| 6,181,075 | B1 |   | 1/2001 | Doss |
| 6,373,200 | B1 |   | 4/2002 | Nerone et al. |
| 8,294,379 | B2 | * | 10/2012 | Liu et al. ........................ 315/224 |
| 8,446,099 | B2 | * | 5/2013 | McCune, Jr. .................. 315/250 |
| 2011/0193490 | A1 | * | 8/2011 | Kumar .......................... 315/246 |
| 2012/0169243 | A1 | * | 7/2012 | Lin et al. ................... 315/200 R |

FOREIGN PATENT DOCUMENTS

WO   2009/011898 A2   9/2009
WO   2010/146529 A1   12/2010

OTHER PUBLICATIONS

"Transition-mode PFC controller", L6562, from STmicroelectronics, Nov. 2005, pp. 1-16.
PCT Search Report and Written Opinion dated Jun. 5, 2012, from corresponding Application No. PCT/US2012/025839.

* cited by examiner

Primary Examiner — Tung X Le
(74) Attorney, Agent, or Firm — Fay Sharpe LLP

(57) ABSTRACT

Drivers and ballast circuits are presented having a boost converter with a triac compatibility circuit providing regulated current load to accommodate phase-cutting triac circuit holding current requirements, including auto switching driver circuit with overvoltage protection and an auto leveling circuit to regulate against thermal and load fluctuations.

19 Claims, 4 Drawing Sheets

AUTO-SWITCHING TRIAC COMPATIBILITY CIRCUIT WITH AUTO-LEVELING AND OVERVOLTAGE PROTECTION

BACKGROUND OF THE DISCLOSURE

Continuous dimming of incandescent lamps is typically accomplished using triac-equipped wall or table-top dimmer circuits connected in line with the lamp bulb, using so-called "phase cut" dimming where a portion of the line AC waveform is essentially removed in each AC cycle to reduce the light output. Integral electronic lamps such as compact fluorescent designs (CFLs) and LED lamps have recently become more popular in which the lamp includes electronic driver circuitry to generate high frequency AC power to drive a fluorescent light source or DC to drive one or more LEDs. These devices can be used in conventional lamps designed for incandescent bulbs and may include dimming circuitry allowing the light output to be adjusted by phase-cut dimming (triac control). Phase cut wall dimming circuits use triac that require a minimum amplitude of latching current and holding current to remain conductive until the completion of the line power half-cycle.

Conventional, capacitive input filter rectifier circuits for electronic lighting power circuits cannot provide these requirements, particularly for low dimming levels, where input capacitance can disrupt the continuity of the triac and its firing circuit. Low power resistive inputs may also not be enough to meet the triac requirements. Aperiodic triac operation can produce anon periodic variation of the input power, leading to flicker in lighting systems. Other types of boost circuits have been used which draw a sinusoidal input current, but these can cause the dimmer triac to stop conducting before the end of the power line half-cycle. Because the input current is not constant in these circuits, the triac current may drop below the triac holding current and triac conduction cannot be maintained. Other passive techniques have also been employed which cannot maintain a constant input current. It is therefore desirable to provide a constant current load in lighting system power circuits to prevent early turn off of triac type dimming devices.

SUMMARY OF THE DISCLOSURE

The present disclosure provides power circuits for lighting systems such as LED drivers or AC driven light sources with boost converter stages having circuitry to accommodate connection to triac based dimmers. A triac compatibility circuit provides steady current flow to meet holding current requirements of the dimming triac to avoid or mitigate flicker problems by maintaining the triac conduction from the firing point until the end of the power line half cycle. Various aspects of the disclosed compatibility circuits include auto switching driver circuitry, overvoltage protection, and/or auto leveling circuitry to regulate against changing temperature and/or loading conditions.

In accordance with one or more aspects of the disclosure, a light source power circuit is provided, which includes a rectifier followed by a boost converter and a subsequent DC to DC converter circuit. The DC to DC converter in certain embodiments is a buck converter providing an output to drive one or more LED light sources. In other embodiments, an inverter is provided that receives the output of the DC to DC converter circuit and provides an AC output to power a fluorescent lamp. The boost converter includes a triac compatibility circuit with a switch and a driver circuit having a sense resistor to sense current flowing in the switch. The driver provides a control signal to operate the switch according to the voltage across the sense resistor to provide a regulated current flow in the boost converter independent of phase-cutting at the AC input terminals of the rectifier. In certain embodiments, an auto switching (self-oscillating) driver circuit is provided, which generates a variable frequency alternating switch control signal.

In some embodiments, the triac compatibility circuit includes an auto leveling circuit which selectively adjusts the boost converter current flow based on temperature changes in the circuit and/or on loading changes in the power circuit. The auto leveling circuit may be implemented using a capacitor with a first terminal connected to the circuit ground and a diode with an anode connected to the second capacitor terminal and a cathode connected to the rectifier, with a resistor coupled between the anode of the diode and a switch control terminal of the driver circuit to provide a signal from the capacitor to selectively adjust the boost converter current flow. Certain embodiments may include an over-voltage protection circuit which selectively adjusts the current flow to limit the voltage across the bus capacitance, where the protection circuit may include a zener diode with a cathode coupled to the bus capacitance and a resistor coupled between the zener diode anode and the driver circuit switch control terminal to provide a signal from the zener diode to selectively adjust the current flow in the boost converter according to the bus voltage.

BRIEF DESCRIPTION OF THE DRAWINGS

One or more exemplary embodiments are set forth in the following detailed description and the drawings, in which.

DETAILED DESCRIPTION OF THE PREFERRED EMBODIMENTS

Figure 1:
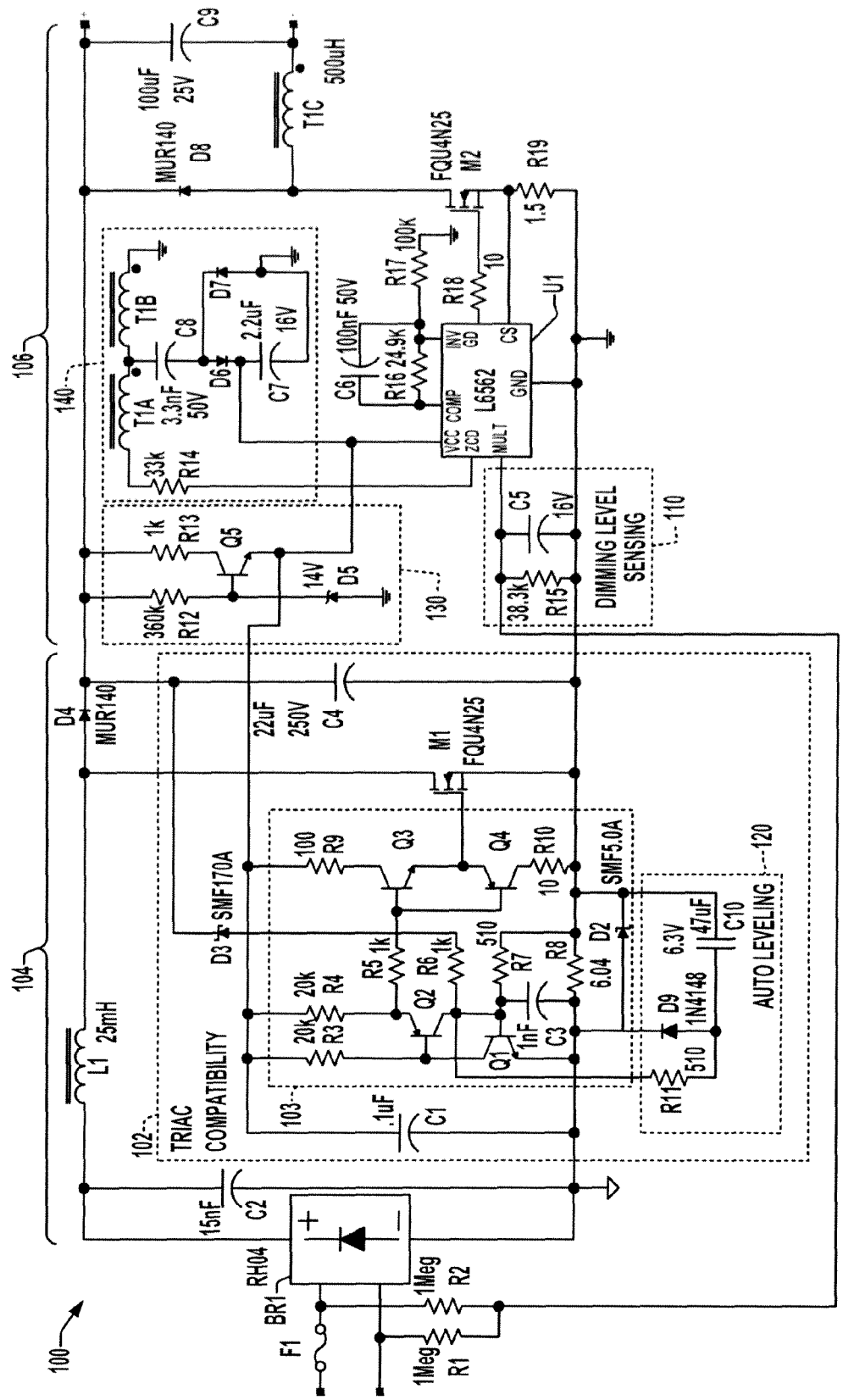
FIG. 1 is a schematic diagram illustrating an exemplary LED driver or ballast circuit having a boost converter stage including an auto switching triac compatibility circuit with auto leveling and over-voltage protection circuits in accordance with one or more aspects of the present disclosure.
Figure 6:
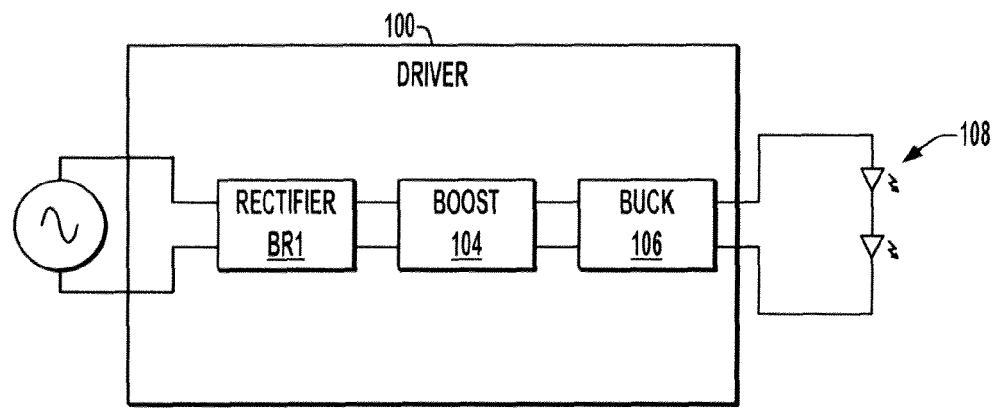
FIG. 6 is a simplified schematic diagram illustrating the circuit of FIG. 1 in an LED driver application for powering one or more LED light sources.
Figure 7:
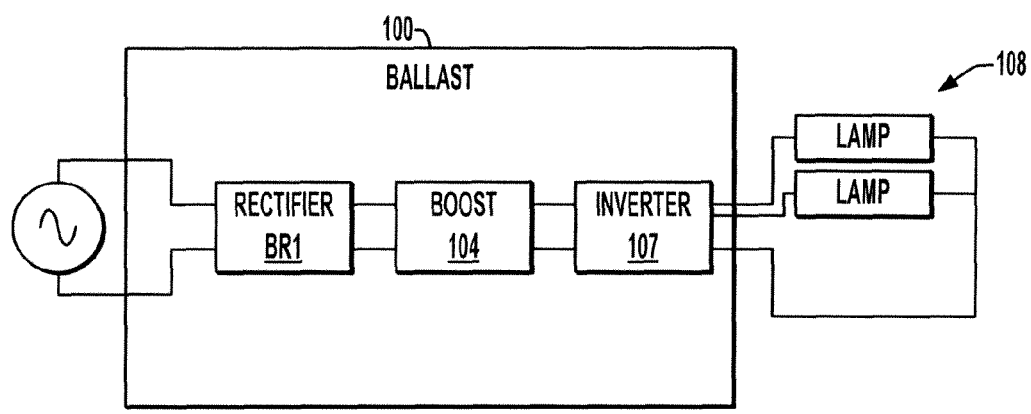
FIG. 7 is a simplified schematic diagram illustrating the circuit of FIG. 1 in a ballast implementation to power one or more fluorescent lamps.

Referring now to the drawings, like reference numerals are used to refer to like elements throughout and the various features are not necessarily drawn to scale. FIGS. 1, 6 and 7 illustrate an exemplary LED driver or ballast circuit 100, which includes an AC input stage, a rectifier BR1, and an auto switching boost converter circuit 104 with a first switching device M1 that converts input power to a provide a DC bus. The circuit 100 also includes a buck DC-DC converter circuit 106 with a pulse width modulated switch M2 switching DC bus power via a transformer winding T1 and a diode D8 to drive an LED output load 108 in driver implementations (FIG. 6). Other DC driver applications can include an inverter receiving the DC output of the boost converter 104 and driving an isolation transformer with an output rectifier for powering one or more LEDs. As seen in FIG. 7, moreover, the illustrated circuit 100 can be used in ballast applications with the boost converter 104 (including the disclosed triac compatibility circuit 102) preceding an inverter 107 to drive AC powered light sources, such as fluorescent lamps 108.

Figure 2:
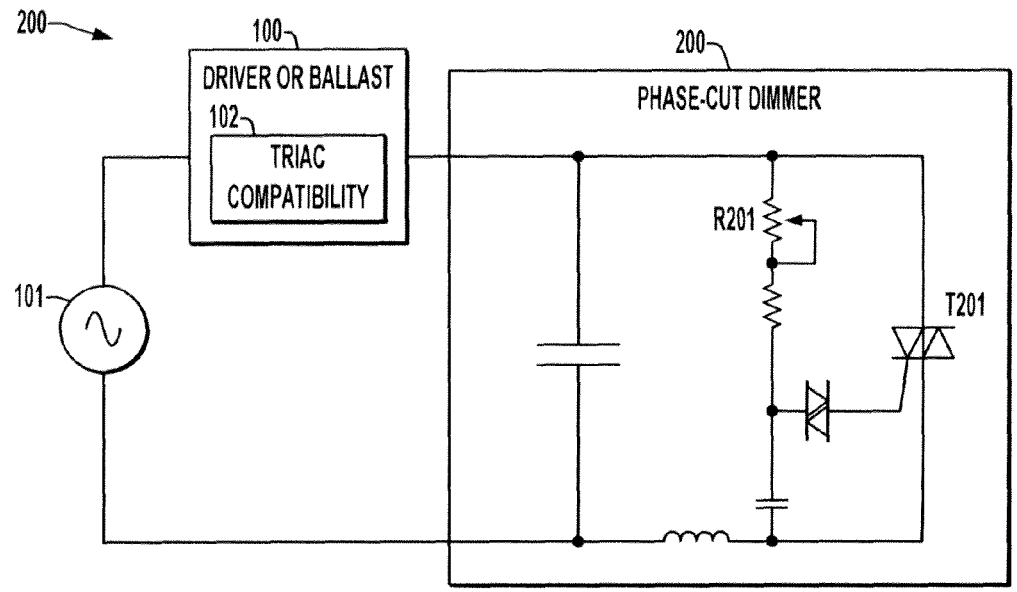
FIG. 2 is a schematic diagram illustrating the driver or ballast connected with a phase-cut dimmer for dimming operation.

As shown in FIG. 2, the driver 100 may be powered from a single-phase AC source 101 with dimming control via a phase-cut dimmer 200 coupled in series with the source 101 and the driver 100. In this case, the dimmer control 200 selectively cuts or interrupts current flow in portions of each cycle of the AC source 101 (phase cutting) using a triac T201 to dim the light output according to a user-adjustable resistance R201. In certain embodiments, the driver circuitry 100 is housed in a structure having an Edison base with AC input terminals.

Retelling again to FIG. 1, the driver 100 receives AC power from a single-phase input source and provides dimming functionality by operation of the phase-cut dimmer 200. A four-element rectifier bridge BR1 rectifies AC input power applied to the input terminals to provide a DC bus voltage across a capacitance C2, with a series inductance L1 and a diode D4 provided in an upper DC bus path following the capacitance C2, and an electrolytic capacitor C24 is coupled across the DC bus after the diode D4. A boost converter circuit 104 is thus provided, which includes a triac compatibility circuit 102 with an auto-switching (self-oscillating) driver circuit 103 operating the boost converter switch M1 to provide a boosted DC bus voltage across the electrolytic capacitor C4 using current provided by the inductor L1.

The circuit 104 forms a continuous conduction boost converter that provides compatibility with triac-based dimmers by maintaining a constant current flowing through the input rectifier BR1 and any attached phase cut dimmer 200, independent of the instantaneous value of power line voltage. The minimum current level of the circuit 102 is determined by the minimum holding current of the triac of the phase-cut dimmer 200. The dimmer triacs typically have a holding current of 50 ma or less. The illustrated circuit is designed to ensure at least 50 ma flow to make sure that once the triac latches, it stays on and conducts for the rest of the power line half-cycle (until the next zero crossing). In this manner, the compatibility circuit 102 provides a load to the power line (whether interrupted by a phase-cutting triac or not) and embodiments can achieve high power factor, such as about 0.93 to 0.94.

The regulated current level of the compatibility circuit 102 is set by the value of a sense resistor R8 of the self-oscillating circuit 103 to maintain a current flow slightly greater than the holding current of the external triac T201. A transorb D2 is connected across R8 for handling high bursts of energy, such as when line transients occur or during the initial power up where there may be an inrush of current to charge of the electrolytic capacitor C4. D2 is coupled across R8 to protect against large transients in the sensed current. When the triac is tired, current will quickly build up and be maintained by the circuit 102 around the holding current level. Thus, the triac continues to conduct until the power line voltage finishes one half of a cycle. A small input capacitor, C2 (15 nF in one embodiment) ensures that the triac T201 will latch without excessive ringing of the input current, and the self-oscillating circuit 103 of the boost converter thereafter maintains conduction of the triac. In certain embodiments, R8 is set so as to maintain at least 50 mA triac holding current and input power as low as 6 Watts is possible. The illustrated circuit 106 thus facilitates flicker free light source operation when dimmed using wall dimmers, provides high power factor and complies with FCC Class B consumer requirements.

The triac compatibility circuit 102 in FIG. 1 has an auto switching driver circuit 103 including a four layer switch configuration including PNP and NPN transistors Q1 and Q2, respectively, biased to an upper DC supply (VCC 15V provided by a power circuit 130 of the buck converter stage 106 in one example) via resistors R3 and R4, with a capacitor C1 stabilizing the supply VCC. The collector of Q1 is connected to the base of Q2 for SCR type operation and the base of Q1 operates as a trigger control terminal actuated by provision of sufficient base-emitter voltage via base resistor R7 according to the current flowing in the sense resistor R8. In this configuration, Q1 and Q2 turn on and off together, and the pair provides a signal through resistor R5 to a buffer formed by Q3 and Q4 (MBT3946DW in one implementation).

The collector of the PNP transistor Q3 is connected to the supply line VCC by a resistor R9 and the collector of the NPN transistor Q4 is coupled to the ground terminal of M1 by a resistor R10. The pair Q3, Q4 operates as a buffer with the emitters connected to drive the gate of M1 high or low based on the trigger signal from Q1 and Q2 which is connected by resistor R5 to the bases of Q3 and Q4. The circuit 102 operates as an auto-switching or self-oscillating boost converter in conjunction with the switch M1, the inductor L1 and the diode D4, which self starts upon powerup. The circuit 102, moreover, optionally includes an overvoltage protection feature via a zener diode D3 and resistor R6, as well as an auto leveling circuit 120 formed by a capacitor C10, diode D9, and a resistor R11.

The compatibility circuit 102 is auto-switching (self-oscillating) and thus the frequency is variable. In operation, the base circuit of Q1 senses the voltage across R8 via base resistor R7, and when the current through R8 is high enough, Q1 turns on to pull the base of Q2 low. This turns PNP transistor Q2 on, which operates the buffer formed by Q3 and Q4 to turn off the MOSFET switch M1 by Q3 turning off and Q4 turning on to pull gate of M1 low. The reduced flow of current through M1 lowers the voltage across the sense resistor R8, thus turning Q1 and Q2 off. This allows the base of NPN transistor Q3 to rise thereby turning Q3 on and turning Q4 off. As a result, the gate voltage of M1 rises and M1 turns back on, and the circuit oscillates back and forth in this manner at a varying frequency. The triac compatibility circuit 102 thus provides a hysteretic auto-switching configuration that self-oscillates from power up and provides a continuous load to the power line during phase-cut dimming operation and otherwise. The oscillation frequency 310 in FIG. 3 is a function of the inductance of L1 (e.g., 25 mH in one embodiment) and the current sense resistor R8 (approximately 6Ω in the example of FIG. 1).

Figure 3:
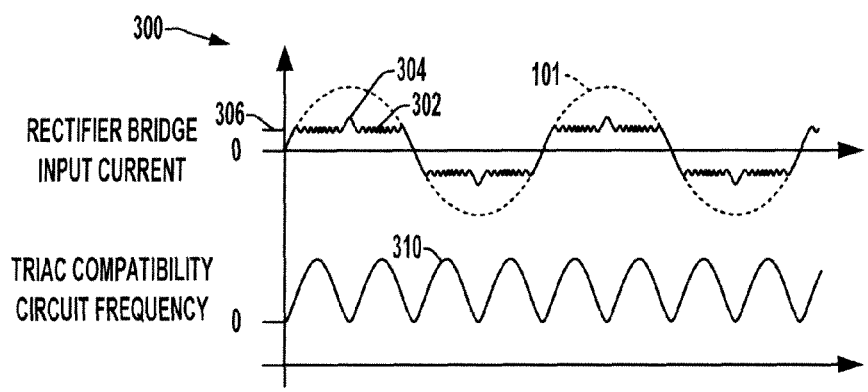
FIG. 3 is a graph illustrating triac compatibility circuit current and frequency waveforms for non-phase cutting operation of the system of FIGS. 1 and 2.
Figure 5:
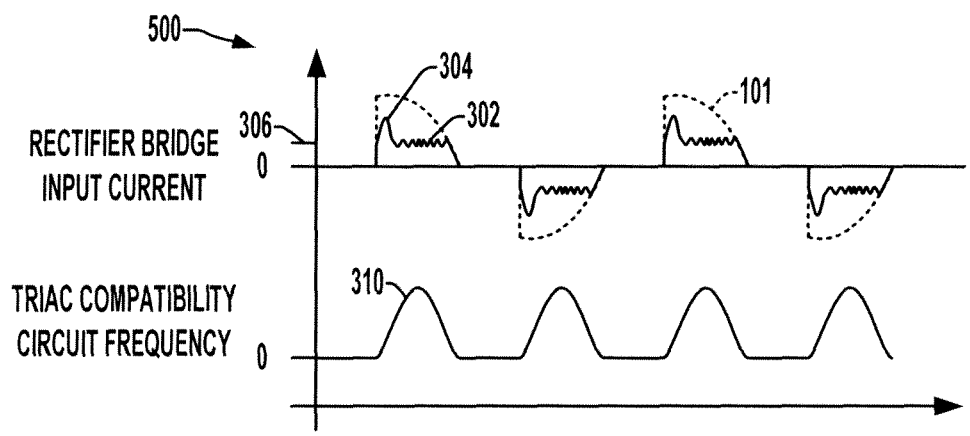
FIG. 5 is a graph illustrating triac compatibility circuit current and frequency waveforms for phase cutting operation of the system.

FIG. 3 illustrates a graph 300 showing the rectifier bridge input current 101 and the current 302 thereof which is conducted by the triac compatibility circuit 102, and graph 500 in FIG. 5 shows operation during phase-cut dimming. As seen in the graph 300, the compatibility circuit oscillation frequency 310 goes from zero at the power line zero crossings and increases to a point near the middle of the power line half-cycle where the electrolytic capacitor C4 charges through peak charging. This causes a current bump 304, after which the frequency 310 decreases back to zero at the next line power zero-crossing, and the process repeats. The hysteretic current 302 in the circuit 102 is a function of the boost converter configuration formed by the FET M1, the inductor L1 and the diode D4. The circuit 100 thus forms an auto-switching boost converter with the output capacitor C4 providing a DC bus for the subsequent converter stage 106, where the current is in the general form of a square wave 302 with small high frequency variations and the peak charging bumps 304 as shown in FIG. 3, rather than following a sine wave.

The auto leveling circuit 120 includes a capacitor C10, a diode D9, and a resistor R11 that connects to the base circuit of Q1. Resistor R11 has the same resistance value as the other base resistor R7 (510Ω), D9 is an ordinary diode such as a 1N4148, and C10 is a 47 uF capacitor in the illustrated embodiment. The circuit 120 performs temperature compensation and load regulation, for example to accommodate changes in the temperature of the base-emitter junction of Q1 and/or changing load conditions e.g., load current increasing or decreasing). Such variations cause the voltage on the electrolytic capacitor C4 to change.

The auto leveling circuit 120 compensates for these changes by essentially regulating the extent of the peak charging pulses (bumps 304) of the electrolytic bus capacitor C4. Circuit 120 measures the peak current flowing through the electrolytic capacitor C4 which supports the DC bus. If the current is too high, corresponding to a deficiency in the boost converter current, the driver circuit 103 will raise this current until the peak electrolytic current reduces to an acceptable level that maintains high power factor and low THD (e.g., less than about 35% in the illustrated embodiment). Conversely, if the peak current of C4 is too low, the circuit 120 will lower the current of the boost converter 104, thereby maintaining high power factor.

As seen in FIG. 3, the normal current 302 consumed by the compatibility circuit 102 is generally a square wave, with high frequency components along a nominal current level 306 and bumps or pulses 304 occurring during charging of C4. The switching frequency 310 of M1 by the self-oscillating circuit of Q1 and Q2 is zero at the start of the cycle, and is also zero at the bump 304. Between these points, the frequency 310 ramps up and then ramps down depending on the power line voltage. The maximum frequency points in FIG. 3 correspond to about 45 degrees, 135 degrees, 225 degrees, and 315 degrees. The bump 304 corresponds to the electrolytic capacitor C4 charging, because there is low FET switching frequency, so the capacitor C4 charges slightly. As seen in the graph 500 of FIG. 5, the triac compatibility circuit 102 also operates to provide steady current loading to meet the holding current requirements of a triac dimmer 200 during phase cutting.

Figure 4:
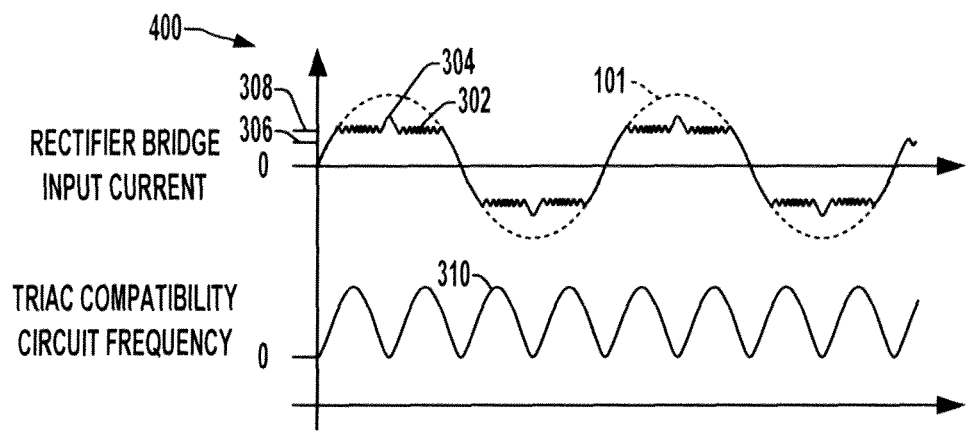
FIG. 4 is a graph illustrating adjustment of the current waveform by an auto leveling circuit in the triac compatibility circuit.

Referring now to the graph 400 in FIG. 4, the compatibility circuit 102 also provides over-voltage protection. If the load increases, the nominal current level 306 will tend to decrease, but the duration and magnitude of the electrolytic capacitor peak-charging bump or spike 304 will increase. This is due to the sensed current through R8 (indicative of the load current) increasing, thereby forcing the FET M1 to stay off for longer at the charging occurrences 304. As the voltage across the sense resistor R8 increases, the capacitor C4 charges to a higher DC level. The increased voltage across R8 also causes an increase in the amount of charging of the auto-leveling circuit capacitor C10. After the electrolytic capacitor charging bump recedes, a negative bias is applied to the base of Q1 by conduction of current from the auto-leveling capacitor C10 through resistor R11. This negative offset to the Q1 base voltage causes a delay in the turn-on of Q1 because the normal actuation via resistors R8 and R7 must counteract that bias to achieve the required base-emitter voltage to turn Q1 on. This delay, in turn, allows the FET M1 to remain on for a longer time, thus raising the nominal current level to a higher value 308 seen in FIG. 4, thereby counteracting the increased output load. Assuming the increased loading persists, the circuit will reach equilibrium at the higher nominal current level 308 at which the bump magnitude 304 is approximately what it was before the load change. The converse operation is provided for load decreases, with the circuit 120 reacting to reductions in the magnitude of the peak-charging bump 304 to provide offsetting positive bias to the Q1 base via capacitor C10 and resistor R11. Moreover, the circuit 120 counteracts thermal drill effects in the circuit components, such as changes to the base-emitter junctions of the transistor Q1, etc. Thus, the auto-leveling circuit 120 provides stability in regulating against load fluctuations, temperature variations, etc.

The circuit 102 also includes over-voltage protection components D3 and R6. When the output of the system 100 is unloaded, this circuitry prevents the DC bus from climbing beyond the design target. In operation, this transient voltage suppressor (TVS) senses the DC bus of the boost converter by connection of the zener diode D3 to the positive terminal of the bus capacitor C4. The zener D3 is connected in series with a resistor R6 that is connected to the base of Q1. If the output load is removed or its impedance increases significantly, the closed loop operation of the boost converter will cause the voltage of the electrolytic capacitor C4 to increase. If the voltage rises too far, the over-voltage protection zener diode D3 (e.g., SMF170A with a 170 volt Vz in one example) starts to conduct. When this happens, current is provided through the resistor R6 to the base of Q1, which turns on Q1 and Q2, and the buffer formed by Q3 nod Q4 will turn off the FET M1, essentially providing a positive bias to the Q1 base circuit to cause the M1 shutoff to occur sooner. If the voltage across C4 continues to rise, a point can be reached where the operation of the Q1 base circuit biasing via zener D3 and resistor R6 will cause M1 to significantly reduce the current flow by going to a high frequency operating state. For no load conditions, for instance, the circuit will stabilize with the voltage across C4 slightly above the rectified line voltage level with M1 being switched at a high frequency to effectively limit the amount of current flowing through M1. Thus, the triac compatibility circuit 102 provides auto-switching functionality in combination with over-voltage protection.

As noted above, the circuit 100 can be used as a DC driver for an LED array type light source load 108, or can be used as an initial stage followed by an inverter 107 for powering a fluorescent lamp light source 108 in a ballast configuration. In the exemplary circuit 100, a pulse width modulated buck type power circuit 106 receives the DC bus voltage across C4 and includes a second power switch (e.g., MOSFET) M2. M2 operates according to a pulse width modulated control input signal applied by a PWM controller or driver U1 to the gate of M2 to control application of DC power to an output load 108, such as an LED array or a subsequent inverter stage 107. The controller U1 in certain embodiments can be a transition mode power factor correction (PFC) controller L6562 IC available from Intersil and STMicroelectronics. U1 has an amplifier input INV coupled with an internal error amplifier, as well as a gain input MULT and an internal pulse width modulator with a drive output GD providing the PWM control signal to the gate of M2 to set the output power level based at least in part on the amplifier input INV and the gain input MULT. When M2 is on, current conducts through the output capacitor C9 and a transformer primary winding T1C to charge the output capacitor C9 to provide DC output power to drive the load.

The switch M2 is thus connected in series between the winding T1C and the circuit ground GND along with a series-connected sense resistor R19. As primary current flows through the series circuit, the current through R19 provides a corresponding voltage at a comparator input terminal CS of the controller U1 for cycle-to-cycle control of the primary current. The drive output GD provides a pulse width modulated control signal via resistor R18 to the gate of M2 at least partially according to the sensed load current, the amplifier input INV, and the gain input MULT. U1 includes an on-board error amplifier with an inverting input INV and an output COMP to allow external connection of a compensation network between the INV and COMP pins. In the present embodiment, resistor R16 and capacitor C6 are connected as shown in FIG. 1 with a resistor R17 connected from the input INV to a circuit ground. The illustrated embodiment uses the multiplier input MULT as a dimming control input to change the duty cycle of the gate drive signal GS and thus the level of the output current. The input to the input MULT is a DC voltage proportional to the rectified average of the power line voltage. A triac will reduce this voltage as it reduces the angle during which current can flow.

The current flowing in M2 is sensed via the resistor R19, and the resulting voltage $V_S$ is applied to the CS pin and compared with a reference generated by the multiplier to determine the MOSFET's turn-off. In practice, the gate drive output GD is selectively disabled according to the ZCD input signal status for transition-mode operation, where a negative-going edge triggers the MOSFET's turn-on. This advantageously allows connection to an optional zero current detection circuit 140 such that the switch M2 will turn on when the current through the primary winding T1C is zero. The ground pin GND provides a current return path for both the signal part and the gate driver circuitry of U1.

A zero crossing detection circuit 140 is provided, which includes sense windings T1A and T1B wound on the core of transformer T1 and magnetically coupled with the primary winding T1C. Circuit 140 also includes a center node connecting T1A and T1B with capacitor C8. The lower terminal of C8 is coupled to VCC through diode D6 and to ground through diode D7, and a bypass capacitor C7 is connected from VCC to ground GND. The zero crossing circuit 140 senses a zero crossing condition of the primary winding T1C using the sense windings T1A and T1B and selectively provides a signal to the zero crossing detect input LCD of the PWM controller U1 via resistor R14 indicating a sensed zero crossing condition of the primary winding T1C.

The illustrated circuit also includes a power circuit 130 providing the control voltage VCC (e.g., 15 volts in one embodiment) for use by both the controller U1 and the triac compatibility circuit 102. The power circuit 130 includes a PNP transistor Q5 with a collector coupled to the upper DC bus line via resistor R13 and a gate coupled to the upper DC bus by resistor R12 and to the circuit ground GND via a 14V zener diode D5.

A sensing circuit 110 (FIG. 1) is coupled with the input terminals to provide a sensor signal to the gain input MULT of U1. The sensing circuit 110 in the illustrated embodiment generates the sensor signal via a resistor R1 coupled between a first AC input terminal and the gain input MULT and a second resistor R2 coupled between the second AC input terminal and the gain input MULT, with the resistors R1 and R2 forming a voltage divider with a resistor R15 coupled from the MULT terminal to ground GND, and a filter capacitor C5 connected in parallel across R15. The sensing circuit 110 provides the sensor signal to the gain input MULT as a full-wave rectified waveform with a DC level corresponding to the applied input voltage. As a result, the MULT input signal value will be reduced when a phase-cutting dimmer 200 is operated for dimming the light source output. In response, the controller U1 modifies the pulse width modulated output at the GD terminal according to the MULT input signal value to selectively reduce the DC output power provided to the load.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. Although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

The following is claimed:

1. A circuit for powering at least one light source, comprising:
   a rectifier having AC input terminals to receive AC input power and first and second DC output terminals to provide rectified DC power;
   a boost converter receiving the rectified DC power from the rectifier and providing a first DC output, the boost converter comprising:
   an inductance having a first terminal coupled with the first DC output terminal of the rectifier and a second terminal,
   a diode with an anode coupled with the second terminal of the inductance and a cathode,
   a bus capacitance with a first terminal coupled with the cathode of the diode and a second terminal coupled to a circuit ground node, and
   a triac compatibility circuit, comprising:
   a switching device coupled between the anode of the diode and the circuit ground, and including a control terminal, the switching device operative to selectively electrically couple the anode of the diode and the circuit ground or to disconnect the anode of the diode from the circuit ground according to a signal received at the control terminal, and
   an auto switching driver circuit including a sense resistor coupled between the circuit round and the second DC output terminal of the rectifier to sense current flowing in the switching device, the auto switching driver circuit operative to provide a variable frequency alternating switching control signal to the control terminal of the switching device based at least in part on a voltage across the sense resistor to provide a regulated current flow in the boost converter independent of phase-cutting at the AC input terminals of the rectifier; and a DC to DC converter circuit with DC input terminals coupled with the first and second terminals of the bus capacitance, and DC output terminals providing a second DC output to directly or indirectly provide power to at least one light source.

2. The circuit of claim 1, where the DC to DC converter circuit is a buck converter providing an output to drive at least one LED light source.

3. The circuit of claim 1, comprising an inverter receiving the second DC output from the DC to DC converter circuit and providing an AC output to power at least one fluorescent lamp.

4. The circuit of claim 1, where the triac compatibility circuit comprises an auto leveling circuit operatively coupled with the auto switching driver circuit to selectively adjust the current flow in the boost converter based on at least one of temperature changes in the circuit and loading changes in the circuit.

5. The circuit of claim 4, where the auto leveling circuit comprises:
a capacitor with a first terminal connected to the circuit ground and a second terminal;
a diode with an anode connected to the second terminal of the capacitor and a cathode connected to the second DC output terminal of the rectifier; and
a resistor coupled between the anode of the diode and a switch control terminal of the auto switching driver circuit to provide a signal from the capacitor to selectively adjust the current flow in the boost converter.

6. The circuit of claim 5, where the triac compatibility circuit comprises an over-voltage protection circuit operatively coupled with the auto switching driver circuit to selectively adjust the current flow in the boost converter to limit a voltage across the bus capacitance.

7. The circuit of claim 6, where the over-voltage protection circuit comprises:
a zener diode with a cathode coupled to the first terminal of the bus capacitance and an anode; and
a resistor coupled between the anode of the zener diode and the switch control terminal of the auto switching driver circuit to provide a signal from the zener diode to selectively adjust the current flow in the boost converter based at least partially on the voltage across the bus capacitance.

8. The circuit of claim 4, where the triac compatibility circuit comprises an over-voltage protection circuit operatively coupled with the auto switching driver circuit to selectively adjust the current flow in the boost converter to limit a voltage across the bus capacitance.

9. The circuit of claim 8, where the over-voltage protection circuit comprises:
a zener diode with a cathode coupled to the first terminal of the bus capacitance and an anode; and
a resistor coupled between the anode of the zener diode and a switch control terminal of the auto switching driver circuit to provide a signal from the zener diode to selectively adjust the current flow in the boost converter based at least partially on the voltage across the bus capacitance.

10. The circuit of claim 1, where the triac compatibility circuit comprises an over-voltage protection circuit operatively coupled with the auto switching driver circuit to selectively adjust the current flow in the boost converter to limit a voltage across the bus capacitance.

11. The circuit of claim 10, where the over-voltage protection circuit comprises:
a zener diode with a cathode coupled to the first terminal of the bus capacitance and an anode; and
a resistor coupled between the anode of the zener diode and a switch control terminal of the auto switching driver circuit to provide a signal from the zener diode to selectively adjust the current flow in the boost converter based at least partially on the voltage across the bus capacitance.

12. A circuit for powering at least one light source, comprising:
a rectifier having AC input terminals to receive AC input power and first and second DC output terminals to provide rectified DC power;
a boost converter receiving the rectified DC power from the rectifier and providing a first DC output, the boost converter comprising:
an inductance having a first terminal coupled with the first DC output terminal of the rectifier and a second terminal,
a diode with an anode coupled with the second terminal of the inductance and a cathode,
a bus capacitance with a first terminal coupled with the cathode of the diode and a second terminal coupled to a circuit ground node, and
a triac compatibility circuit, comprising:
a switching device coupled between the anode of the diode and the circuit ground, and including a control terminal, the switching device operative to selectively electrically couple the anode of the diode and the circuit ground or to disconnect the anode of the diode from the circuit ground according to a signal received at the control terminal,
a driver circuit including a sense resistor coupled between the circuit ground and the second DC output terminal of the rectifier to sense current flowing in the switching device, the auto switching driver circuit operative to provide a switching control signal to the control terminal of the switching device based at least in part on a voltage across the sense resistor to provide a regulated current flow in the boost converter independent of phase-cutting at the AC input terminals of the rectifier, and
an auto leveling circuit operatively coupled with the driver circuit to selectively adjust the current flow in the boost converter based on at least one of temperature changes in the circuit and loading changes in the circuit; and
a DC to DC converter circuit with DC input terminals coupled with the first and second terminals of the bus capacitance, and DC output terminals providing a second DC output to directly or indirectly provide power to at least one light source.

13. The circuit of claim 12, where the auto leveling circuit comprises:
a capacitor with a first terminal connected to the circuit ground and a second terminal;
a diode with an anode connected to the second terminal of the capacitor and a cathode connected to the second DC output terminal of the rectifier; and a resistor coupled between the anode of the diode and a switch control terminal of the driver circuit to provide a signal from the capacitor to selectively adjust the current flow in the boost converter.

14. The circuit of claim 13, where the triac compatibility circuit comprises an over-voltage protection circuit operatively coupled with the driver circuit to selectively adjust the current flow in the boost converter to limit a voltage across the bus capacitance.

15. The circuit of claim 14, where the over-voltage protection circuit comprises:
a zener diode with a cathode coupled to the first terminal of the bus capacitance and an anode; and
a resistor coupled between the anode of the zener diode and a switch control terminal of the driver circuit to provide a signal from the zener diode to selectively adjust the current flow in the boost converter based at least partially on the voltage across the bus capacitance.

16. The circuit of claim 12, where the triac compatibility circuit comprises an over-voltage protection circuit operatively coupled with the driver circuit to selectively adjust the current flow in the boost converter to limit a voltage across the bus capacitance.

17. The circuit of claim 16, where the over-voltage protection circuit comprises:
a zener diode with a cathode coupled to the first terminal of the bus capacitance and an anode; and
a resistor coupled between the anode of the zener diode and a switch control terminal of the driver circuit to provide a signal from the zener diode to selectively adjust the current flow in the boost converter based at least partially on the voltage across the bus capacitance.

18. A circuit for powering at least one light source, comprising:
a rectifier having AC input terminals to receive AC input power and first and second DC output terminals to provide rectified DC power;
a boost converter receiving the rectified DC power from the rectifier and providing a first DC output, the boost converter comprising:
an inductance having a first terminal coupled with the first DC output terminal of the rectifier and a second terminal,
a diode with an anode coupled with the second terminal of the inductance and a cathode,
a bus capacitance with a first terminal coupled with the cathode of the diode and a second terminal coupled to a circuit ground node, and
a triac compatibility circuit, comprising:
a switching device coupled between the anode of the diode and the circuit ground, and including a control terminal, the switching device operative to selectively electrically couple the anode of the diode and the circuit ground or to disconnect the anode of the diode from the circuit ground according to a signal received at the control terminal,
a driver circuit including a sense resistor coupled between the circuit ground and the second DC output terminal of the rectifier to sense current flowing in the switching device, the auto switching driver circuit operative to provide a switching control signal to the control terminal of the switching device based at least in part on a voltage across the sense resistor to provide a regulated current flow in the boost converter independent of phase-cutting at the AC input terminals of the rectifier, and
an over-voltage protection circuit operatively coupled with the driver circuit to selectively adjust the current flow in the boost converter to limit a voltage across the bus capacitance; and
a DC to DC converter circuit with DC input terminals coupled with the first and second terminals of the bus capacitance, and DC output terminals providing a second DC output to directly or indirectly provide power to at least one light source.

19. The circuit of claim 18, where the over-voltage protection circuit comprises:
zener diode with a cathode coupled to the first terminal of the bus capacitance and an anode; and
a resistor coupled between the anode of the zener diode and the switch control terminal of the driver circuit to provide a signal from the zener diode to selectively adjust the current flow in the boost converter based at least partially on the voltage across the bus capacitance.

* * * * *